(12) United States Patent
Pankajakshan et al.

(10) Patent No.: US 7,317,717 B2
(45) Date of Patent: Jan. 8, 2008

(54) INTEGRATED WIRELINE AND WIRELESS END-TO-END VIRTUAL PRIVATE NETWORKING

(75) Inventors: Bejoy Pankajakshan, Overland Park, KS (US); Pedro A. Zamora, Kansas City, MO (US); Mathew A. Dixon, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 673 days.

(21) Appl. No.: 10/832,028

(22) Filed: Apr. 26, 2004

(65) Prior Publication Data

US 2005/0237982 A1 Oct. 27, 2005

(51) Int. Cl.
*H04L 12/66* (2006.01)
(52) U.S. Cl. .......................... 370/352; 370/401; 726/15
(58) Field of Classification Search ........ 370/351–430, 370/331; 709/203, 217–219, 249
See application file for complete search history.

(56) References Cited

U.S. PATENT DOCUMENTS

| 5,717,737 | A | 2/1998 | Doviak et al. |
| 6,542,490 | B1 | 4/2003 | Ahmadvand et al. |
| 6,609,148 | B1* | 8/2003 | Salo et al. ............... 709/217 |
| 2003/0147403 | A1* | 8/2003 | Border et al. .......... 370/395.53 |
| 2003/0196105 | A1 | 10/2003 | Fineberg |

FOREIGN PATENT DOCUMENTS

WO WO 03/075516 9/2003

OTHER PUBLICATIONS

PADCOM, Inc., *Total Roam Technical Overview*, Mar. 25, 2004, pp. 1-39.

* cited by examiner

*Primary Examiner*—Rafael Perez-Gutierrez
*Assistant Examiner*—Abdias Mondesir

(57) ABSTRACT

An end-to-end virtual private networking system transports network packets securely through a public data network. A mobile device comprises an application client and a wireless roaming client managing data transfer from the mobile device to the public data network via one of a plurality of predetermined wireless links. A roaming gateway is located in a data center and is coupled to the public data network for tracking the plurality of predetermined wireless links and for managing data transfer from the public data network to the mobile device via one of the plurality of predetermined wireless links. An enterprise server is provided in a private enterprise for exchanging network packets with the application client in the mobile device. A CPE-VPN router in the private enterprise network is coupled to the enterprise server and to the public data network. A VPN router located in the data center is coupled to the roaming gateway and to the public data network, wherein the VPN router and the CPE-VPN router establish a VPN tunnel therebetween via the public data network. The CPE-VPN router transports the network packets between the enterprise server and the VPN tunnel. The VPN router transports the network packets between the roaming gateway and the VPN tunnel.

23 Claims, 3 Drawing Sheets

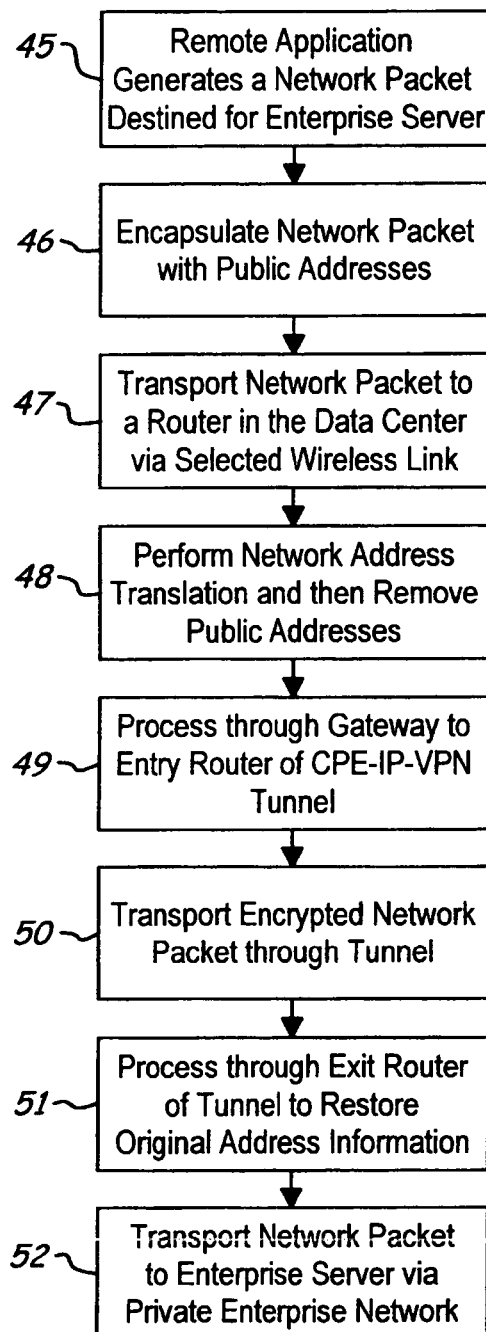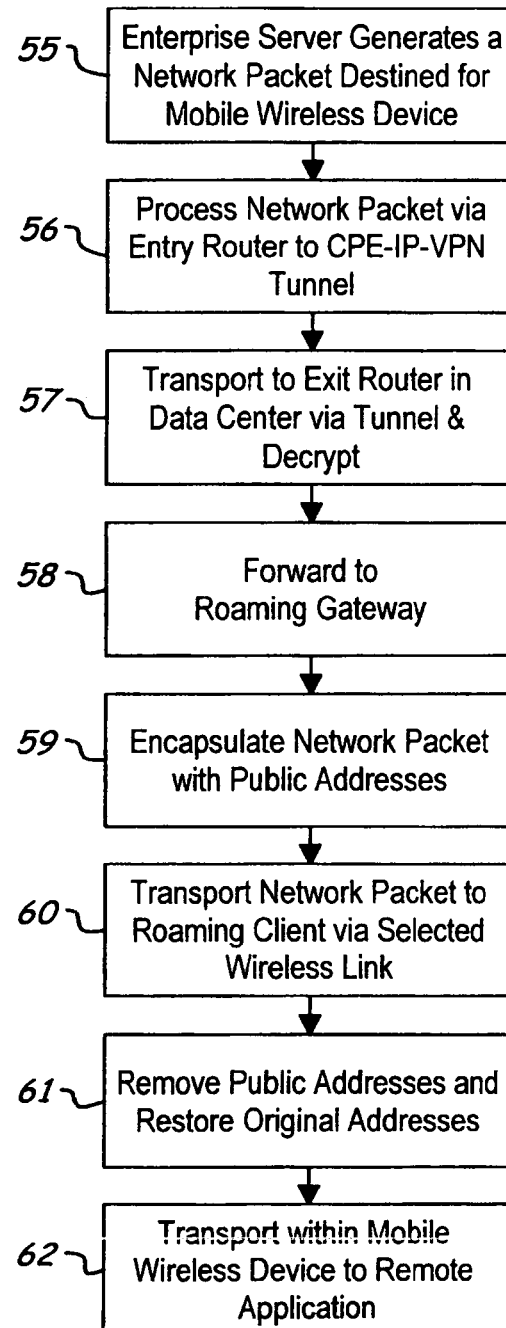
FIG. 4
FIG. 5

INTEGRATED WIRELINE AND WIRELESS END-TO-END VIRTUAL PRIVATE NETWORKING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to virtual private networking, and, more specifically, to secure data network communications between a wireless networking device and an enterprise server within a private, wired data network.

Large and small enterprises (such as businesses, government, non-profit institutions, and other organizations) increasingly rely on digital data communication networks to perform essential tasks. Private computer networks are usually deployed within the enterprise to provide access for enterprise personnel to resources necessary to perform their data processing tasks.

Many data-processing related tasks may be performed at non-enterprise locations, e.g., employees working offsite at a customer location or while traveling to or from such sites. Some enterprise networks may provide remote access of certain network resources to offsite employees. Due to data security concerns when a data network is opened up to outside access, one common access method is via dial-up networking which uses the public telephone network to tie-in to relatively controlled (i.e., secure) digital networks. However, the convenience, availability, and speed of dial-up access are limited. Therefore, public Internet connections are sometimes used. To increase security of data transport over the public data network, virtual private networking (VPN) techniques can be employed to create a secure "tunnel" via the Internet, provided that a wire line connection to the Internet is available.

The availability and use of wireless networking has proliferated as a result of various standards being adopted. Wireless systems include wireless local area networks (e.g., 802.11 networks), wireless cellular systems (e.g., CDMA) and general packet radio service (GPRS). Current wireless systems address the security of data within the wireless network, but have not provided end-to-end protection when sending network packets between a mobile wireless device to a private enterprise network when both a wireless and wireline link are required.

SUMMARY OF THE INVENTION

The present invention has the advantage of tying together a seamless wireless networking solution with a wired CPE-based IP VPN to provide an end-to-end secure connection. The invention provides a managed VPN system for mobile enterprise users who can roam between various wireless networks (e.g., CDMA, GPRS, or WLAN) while maintaining a connection to a central enterprise server over dedicated wireline circuits. Support for the use of Class of Service (CoS) is also provided.

In one aspect of the invention, an end-to-end virtual private networking system transports network packets securely through a public data network. A mobile device comprises an application client and a wireless roaming client managing data transfer from the mobile device to the public data network via one of a plurality of predetermined wireless links. A roaming gateway is located in a data center and is coupled to the public data network for tracking the plurality of predetermined wireless links and for managing data transfer from the public data network to the mobile device via one of the plurality of predetermined wireless links. An enterprise server is provided in a private network for exchanging network packets with the application client in the mobile device. A CPE-VPN router in the private network is coupled to the enterprise server and to the public data network. A VPN router located in the data center is coupled to the roaming gateway and to the public data network, wherein the VPN router and the CPE-VPN router establish a VPN tunnel therebetween via the public data network. The CPE-VPN router transports the network packets between the enterprise server and the VPN tunnel. The VPN router transports the network packets between the roaming gateway and the VPN tunnel.

BRIEF DESCRIPTION OF THE DRAWINGS

FIG. 4 is a flowchart showing a preferred method for directing network packets from a mobile wireless device to an enterprise server.

FIG. 5 is a flowchart showing a preferred method for directing network packets from an enterprise server to a mobile wireless device.

DETAILED DESCRIPTION OF PREFERRED EMBODIMENTS

Figure 1:
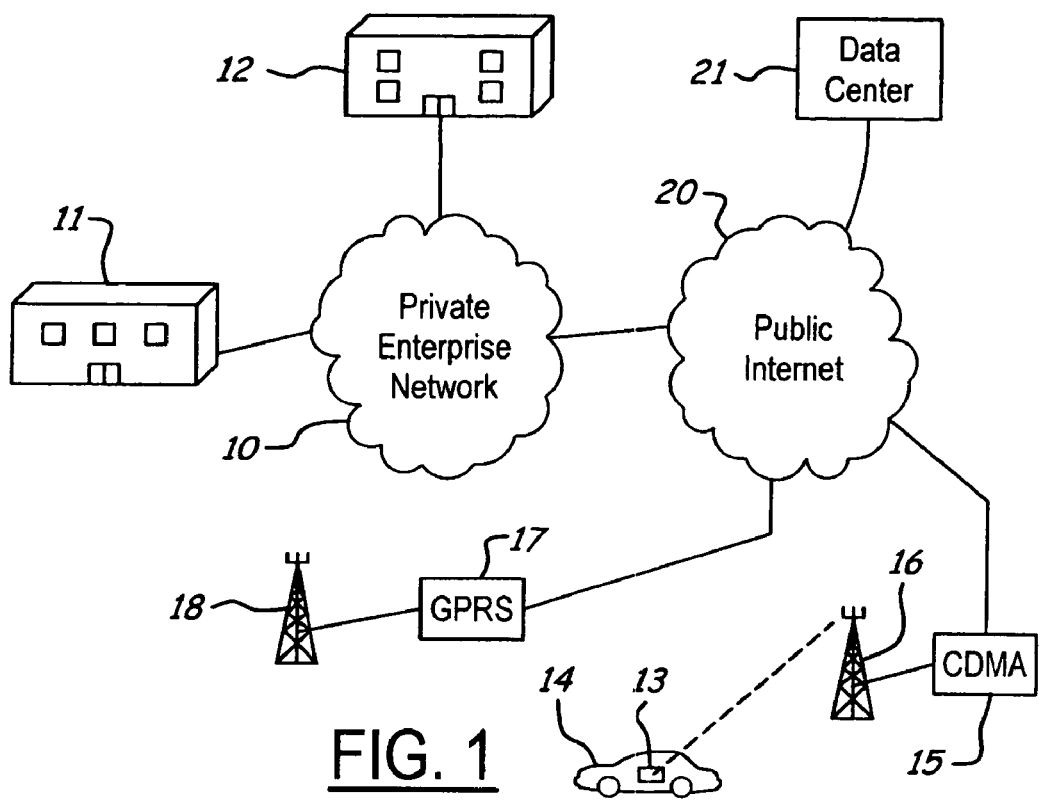
FIG. 1 is a block diagram of a networking system of the present invention.

Referring to FIG. 1, a private enterprise network 10 serves enterprise facilities 11 and 12 and may include local area networks (LANs) and wide area networks (WANs). It is desired for a mobile wireless device 13 (such as a laptop computer or a data-enabled cellular phone) to remotely access resources within private enterprise network 10. Mobile device 13 may be traveling in an automobile 14, for example. Mobile device 13 may typically be capable of connecting with various wireless services depending upon their availability. For example, a CDMA system 15 connected to a wireless tower 16 may be preferentially selected by mobile device 13 when available. A GPRS system 17 connected to a tower 18 may alternatively be selected when in range and according to a predetermined priority scheme when multiple wireless services are available. CDMA system 15 and GPRS system 17 are examples of wireless wide area networks (WANs). Mobile device 13 may also connect to a wireless LAN, such as provided in a public area (e.g., an airport or a hotel lobby), that is provided for connecting users to the Internet.

CDMA system 15 and GPRS system 17 are coupled to the public Internet 20. Although private enterprise network 10 is coupled (e.g., via a gateway) to public Internet 20, a direct connection passing network packets between CDMA system 15 or GPRS system 17 directly to private enterprise network 10 are not utilized due to security concerns. Instead, the present invention employs a data center 21 coupled to public Internet 20 for acting as an intermediary between the mobile wireless device and the resources of private enterprise network 10.

Figure 2:
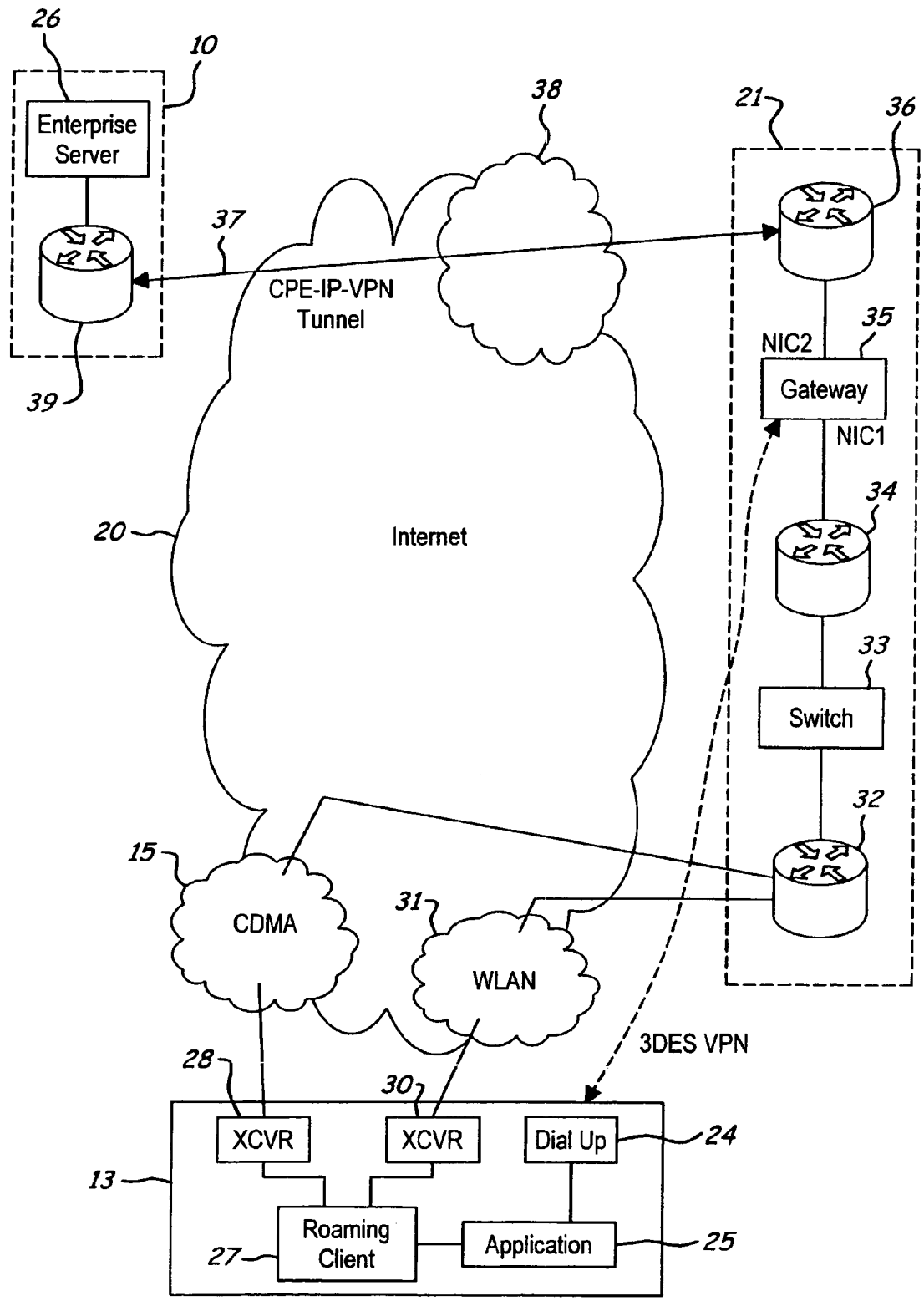
FIG. 2 is a block diagram showing elements of the networking system in greater detail.

The primary elements of the secure network system are shown in greater detail in FIG. 2. Mobile wireless device 13 comprises a digital-computing device for executing a remote application 25. During its operation, application 25 accesses an enterprise server 26 in private enterprise network 10. In order to support wireless roaming between various wireless services, a roaming client 27 is provided in mobile device 13 for interfacing to application 25 and to wireless transceivers 28 and 30, for example. Transceiver 28 is adapted to communicate with CDMA system 15 while transceiver 30 is adapted to communicate with a wireless LAN 31, which may be any wireless LAN deployed remotely from private enterprise network 10 which allows access by the mobile user and which is interconnected with Internet 20. CDMA system 15 and WLAN 31 are connected via Internet 20 to a router 32 in data center 21.

Router 32 is coupled to a port address translation (PAT) router 34 via a switch 33. In order to obtain data security within the wireless link from mobile device 13 to router 34 in data center 21, a virtual private network tunnel is created.

Router 34 is coupled to a roaming gateway 35. Roaming client 27 and roaming gateway 35 cooperate to provide seamless wireless roaming for data transport between remote application 25 and a router 36 connected to gateway 35. Roaming client 27 and gateway 35 may be comprised of the TotalRoam® software platform available from Padcom, Inc. of Bethlehem, Pa. In particular, roaming client 27 may utilize the TR6100 client from Padcom. The roaming gateway and roaming client manage the transfer of network packets therebetween in response to availability of various wireless links and a pre-configured priority between links. A VPN tunnel created between the roaming client and the roaming gateway may comprise a VPN tunnel using 3DES encryption, for example. In addition, gateway 35 may be protected by static network address translation or port address translation performed by router 34 as is known in the art.

Router 36 comprises an entry router for a VPN tunnel 37 passing through a provider network 38 via Internet 20 to an exit router 39 located in the private enterprise network 10. In view of the bi-directional communication, routers 36 and 39 each perform the functions of entry and exit routers as appropriate. Router 39 is connected to enterprise server 26 for making enterprise server 26 accessible via the tunnel. VPN tunnel 37 may be created as a site-to-site tunnel that is available as long as there is at least one mobile device accessing it. Such a site-to-site tunnel may be created using IPSec protocols, for example. Alternatively, VPN tunnel 37 may be an application specific tunnel using the SSL protocol.

A specific example of transport of a particular packet will now be described. Example IP addresses of network elements of FIG. 2 are shown in the following chart.

| Network Element | IP Address |
| --- | --- |
| Remote Application 25 | 192.168.9.3/24 |
| Roaming Client 27 | 192.168.9.1/24 |
| WLAN 31 | 144.230.98.XXX |
| Router 32 | 144.230.96.1 |
| Router 34 | 144.230.99.102 |

-continued

| Network Element | IP Address |
| --- | --- |
| Gateway 35 NIC1 | 192.168.8.2/24 |
| Gateway 35 NIC2 | 192.168.20.3 |
| Router 36 | 192.168.20.1 |
| Router 39 | 192.168.21.1/24 |
| Enterprise Server 26 | 192.168.21.2/24 |

During transport of a network packet from application 25 to enterprise server 26, the network packet passes through a virtual private network tunnel between mobile device 13 and gateway 35. Addressing of the network packets is as shown in Table 1 beginning at sequence point 'a' wherein the visible source address is the IP address of remote application 25 and the visible destination address is the IP address of enterprise server 26. A packet moves from application 25 to roaming client 27 where it is encapsulated at sequence point 'b'. After encapsulation, the visible source address becomes a public source address dynamically assigned within the CDMA system, for example. The visible destination address of the encapsulated packet at sequence point 'b' comprises the IP address of router 34, which is a PAT router. The actual source and destination addresses are encapsulated at sequence point 'b' as shown. After router 34 performs network address translations for a network packet, addressing is shown at sequence point 'c' wherein a visible destination address has been translated to the IP address of NIC1 of gateway 35. Gateway 35 de-encapsulates the network packet so that the original source and destination addresses are visible as shown at sequence point 'd'. Thereafter, addressing of the network packet as it passes through the CPE-IP-VPN tunnel is determined according to the specific configuration of that tunnel. Thereafter, the network packet may be transported to enterprise server 26 within the private enterprise network 10.

TABLE 1

| Sequence | Visible SA | Visible DA | Encapsulated SA | Encapsulated DA |
| --- | --- | --- | --- | --- |
| a | 192.168.9.3 | 192.168.21.2 | | |
| b | Public CDMA | 144.230.99.102 | 192.168.9.3 | 192.168.21.2 |
| c | Public CDMA | 192.168.8.2 | 192.168.9.3 | 192.168.21.2 |
| d | 192.168.9.3 | 192.168.21.2 | | |

Once a network packet reaches enterprise server 26, a response or return packet may typically be generated by enterprise server 26 destined for the remote application on the mobile wireless device. Initially, the return network packet is transported through CPE-IP-VPN tunnel 37, exits router 36, and enters gateway 35 at NIC2. The return network packet then passes through the VPN tunnel of the wireless link as shown in Table 2. The visible source and destination addresses correspond to the IP addresses of enterprise server 26 and application 25, respectively, as shown at sequence point 'e'. Gateway 35 encapsulates the network packet providing a source address of gateway 35 NIC1 and a visible destination address corresponding to a public dynamically assigned address within the CDMA system at sequence point 'f'. Next, the visible source address is altered at sequence point 'g' to the IP address of the router exposed to the public network. Once packets arrive at roaming client 27 in the wireless mobile device, the outer IP header having the encapsulating addresses is stripped off and the original source and destination addresses are restored at sequence point 'h'.

TABLE 2

| Sequence | Visible SA | Visible DA | Encapsulated SA | Encapsulated DA |
|---|---|---|---|---|
| e | 192.168.21.2 | 192.168.9.3 | | |
| f | 192.168.8.2 | Public CDMA | 192.168.21.2 | 192.168.9.3 |
| g | 144.230.99.102 | Public CDMA | 192.168.21.2 | 192.168.9.3 |
| h | 192.168.21.2 | 192.168.9.3 | | |

Figure 3:
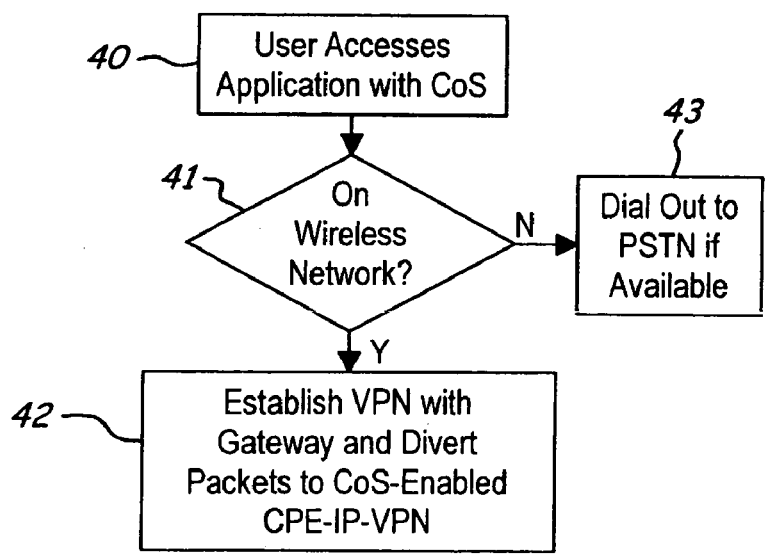
FIG. 3 is a flowchart showing a preferred method for establishing a connection between a mobile wireless device and an enterprise server.

Use of a digital link by the mobile wireless device of the present invention is shown in FIG. 3. In step 40, a user accesses the remote application, preferably in a manner supporting Class of Service (CoS). The use of CoS allows higher priority applications to receive an increased allocation of bandwidth of network transport, resulting in lower latency times. A CoS-enabled application labels its corresponding network packets with a CoS label, as is known in the art. A check is made in step 41 to determine whether one or more wireless networks are available to the mobile wireless device. If available, then the highest priority wireless network is selected, a VPN is established with the roaming gateway via that selected wireless network, and subsequent network packets from the remote application are diverted to the VPN to the roaming gateway and then to the CPE-IP-VPN tunnel traversing the public network to the private enterprise network and to the enterprise server. Preferably, the public network (such as network 38 and Internet 20) are CoS-enabled in order to support the preferred CoS-enabled remote application. If no available wireless network is found in step 41, then the mobile wireless device may instead dial out to the public switched telephone network (PSTN), if available, via a dial-up modem 24 in mobile device 13 (shown in FIG. 2).

A preferred method for transporting network packets in the direction from mobile device 13 to enterprise server 26 is shown in FIG. 4. In step 45, the remote application generates a network packet destined for the enterprise server. In step 46, the network packet is encapsulated with public addresses for traversing the wireless link. The network packet is transported in step 47 to a router in the data center via the In the data center, network address translation is performed on the network packet in step 48 and then the public addresses are removed. In step 49, the network packet is processed through the roaming gateway to the entry router of the CPE-IP-VPN tunnel. In step 50, the network packet is transported in an encrypted form through the tunnel. The network packet is processed through the exit router of the tunnel to restore its original address information. Thereafter, in step 52, the network packet is transported to the enterprise server via the private enterprise network.

A preferred method for transporting a return network packet from the enterprise server to the mobile device is shown in FIG. 5. In step 55, the enterprise server generates a network packet destined for the mobile device. The network packet is processed via the entry router to the CPE-IP-VPN tunnel in step 56. Processing into the VPN tunnel includes encryption as is known in the art. In step 57, the network packet is transported to the exit router and the data center via the tunnel and is then decrypted. The network packet is forwarded to the roaming gateway in step 58.

In step 59, the network packet delivered to the roaming gateway is encapsulated with public addresses corresponding to the selected wireless link. The network packet is transported to the roaming client via the selected wireless link in step 60. Public addresses are removed and the original addresses restored in step 61. In step 62, the network packet is transported within the mobile wireless device to the remote application.

In view of the foregoing description, the present invention has provided a secure end-to-end network transport solution between a mobile application and a fixed enterprise server using wireless and wireline public networks and a private wireline network. In particular, the functions performed by the data center provide a secure bridge between the wireless and wireline environments.

What is claimed is:

1. An end-to-end virtual private networking system for transporting network packets securely through a public data network, comprising:
    a mobile device comprising an application client and a wireless roaming client managing data transfer from said mobile device to said public data network via one of a plurality of predetermined wireless links;
    a roaming gateway located in a data center and coupled to said public data network for tracking said plurality of predetermined wireless links and for managing data transfer from said public data network to said mobile device via one of said plurality of predetermined wireless links, wherein said wireless roaming client and said roaming gateway create a first VPN tunnel therebetween;
    an enterprise server in a private network for exchanging network packets with said application client in said mobile device;
    a CPE-VPN router in said private network coupled to said enterprise server and to said public data network;
    a VPN router located in said data center connected to said roaming gateway and to said public data network, wherein said VPN router and said CPE-VPN router establish a second VPN tunnel therebetween via said public data network;
    wherein said CPE-VPN router transports said network packets between said enterprise server and said second VPN tunnel, and wherein said VPN router transports said network packets between said roaming gateway and said second VPN tunnel; and
    wherein the connection between said VPN router and said roaming gateway provides a secure bridge between said first and second VPN tunnels within said data center.

2. The system of claim 1 wherein said plurality of predetermined wireless links include a wireless LAN link and a wireless WAN link, and wherein said wireless roaming client selects said one of said wireless LAN link or said wireless WAN link in response to availability thereof.

3. The system of claim 1 wherein said data transfer between said mobile device and said roaming gateway within said first VPN tunnel includes encryption of said network packets.

4. The system of claim 1 wherein said roaming gateway comprises a gateway router performing network address translation.

5. The system of claim 1 wherein said VPN tunnel comprises a site-to-site tunnel.

6. The system of claim 1 wherein said VPN tunnel comprises an application-specific tunnel.

7. A data center for providing an end-to-end virtual private networking system for transporting network packets between a mobile device and an enterprise server securely through a public data network, wherein said mobile device comprises an application client and a wireless roaming client managing data transfer from said mobile device to said public data network via one of a plurality of predetermined wireless links, wherein said enterprise server is located in a private network, and wherein a CPE-VPN router is located in said private network for coupling said enterprise server and to said public data network, said data center comprising:
  a roaming gateway located in a data center and coupled to said public data network for tracking said plurality of predetermined wireless links and for managing data transfer from said public data network to said mobile device via one of said plurality of predetermined wireless links, wherein said wireless roaming client and said roaming gateway create a first VPN tunnel therebetween; and
  a VPN router located in said data center connected to said roaming gateway and to said public data network, wherein said VPN router and said CPE-VPN router establish a second VPN tunnel therebetween via said public data network, wherein said VPN router transports said network packets between said roaming gateway and said second VPN tunnel;
  wherein the connection between said VPN router and said roaming gateway provides a secure bridge between said first and second VPN tunnels within said data center.

8. The system of claim 7 wherein said roaming gateway comprises a gateway router performing network address translation.

9. A method of transporting network packets from a mobile wireless device to an enterprise server in a private enterprise network via a wireless data network and a public wireline data network, said wireless data network and said public wireline data network each being coupled to a data center, said method comprising the steps of:
  generating a network packet in said mobile device, said network packet having an original destination address of said enterprise server and an original source address of said mobile wireless device;
  encapsulating said network packet with a public destination address and a public source address associated with said wireless data network;
  transporting said network packet via a first VPN tunnel within said wireless data network to said data center;
  removing said public destination and public source addresses from said network packet;
  processing said network packet via a gateway to an entry router for a second VPN tunnel so that said original destination and said original source addresses are hidden;
  transporting said network packet via said second VPN tunnel within said public wireline data network to an exit router for said second VPN tunnel;
  restoring said original destination and said original source addresses in said network packet; and
  transporting said network packet from said exit router to said enterprise server via said private enterprise network;
  wherein the connection between said entry router and said gateway provides a secure bridge between said first and second VPN tunnels within said data center.

10. The method of claim 9 further comprising the step of: selecting said wireless data network from a plurality of predetermined wireless links.

11. The method of claim 9 wherein said network packet is generated in said mobile wireless device by an application accessing said enterprise server.

12. The method of claim 11 further comprising the step of: labeling said network packet according to a Class of Service (CoS) associated to said application.

13. The method of claim 9 wherein said public destination address is comprised of a network address corresponding to a network-address translation (NAT) router located within said data center, and wherein said NAT router forwards said network packet to said gateway.

14. The method of claim 9 wherein said entry router is located within said data center.

15. The method of claim 9 wherein said exit router is located within said private enterprise network.

16. The method of claim 9 wherein said entry router encrypts said network packet and wherein said exit router decrypts said network packet.

17. A method of transporting network packets from an enterprise server in a private enterprise network to a remote application in a mobile wireless device via a public wireline data network and a wireless data network, said wireless data network and said public wireline data network each being coupled to a data center, said method comprising the steps of:
  generating a network packet in said enterprise server, said network packet having an original destination address of said mobile wireless device and an original source address of said enterprise server;
  processing said network packet in an entry router for a first VPN tunnel so that said original destination and said original source addresses are hidden;
  transporting said network packet via said public wireline data network to an exit router for said first VPN tunnel, said exit router being located in said data center;
  forwarding said network packet from said exit router to a wireless gateway located in said data center;
  encapsulating said network packet with a public destination address and a public source address associated with said wireless data network;
  transporting said network packet via a second VPN tunnel in said wireless data network to a mobile wireless client in said mobile wireless device, wherein the connection between said exit router and said wireless gateway provides a secure bridge between said first and second VPN tunnels within said data center;
  removing said public destination and public source addresses from said network packet within said mobile wireless client;
  restoring said original destination and said original source addresses in said network packet; and
  transporting said network packet from said mobile wireless client to said remote application.

18. The method of claim 17 further comprising the step of: selecting said wireless data network from a plurality of predetermined wireless links.

19. The method of claim 17 further comprising the step of: labeling said network packet according to a Class of Service (CoS) associated to said remote application.

20. The method of claim 17 wherein said public source address is comprised of a network address corresponding to a network-address translation (NAT) router located within said data center, and wherein said NAT router forwards said network packet to said mobile wireless device.

21. The method of claim 17 wherein said entry router is located within said private enterprise network.

22. The method of claim 17 wherein said exit router is located within said data center.

23. The method of claim 17 wherein said entry router encrypts said network packet and wherein said exit router decrypts said network packet.

* * * * *